(12) United States Patent
Ginter

(10) Patent No.: US 8,128,328 B2
(45) Date of Patent: Mar. 6, 2012

(54) FASTENING ELEMENT

(75) Inventor: Herbert Ginter, Germaringen (DE)

(73) Assignee: Hilti Aktiengesellschaft, Schaan (LI)

( * ) Notice: Subject to any disclaimer, the term of this patent is extended or adjusted under 35 U.S.C. 154(b) by 196 days.

(21) Appl. No.: 12/454,642

(22) Filed: May 19, 2009

(65) Prior Publication Data
US 2009/0290952 A1     Nov. 26, 2009

(30) Foreign Application Priority Data

May 21, 2008  (DE) .................. 10 2008 001 903

(51) Int. Cl.
*F16B 1/00* (2006.01)
(52) U.S. Cl. ............. 411/82.3; 411/82; 405/259.6
(58) Field of Classification Search .......... 411/125, 411/82, 82.3; 405/259.5, 259.6
See application file for complete search history.

(56) References Cited

U.S. PATENT DOCUMENTS

| | | | | |
|---|---|---|---|---|
| 4,015,433 A | * | 4/1977 | Shibata | 405/259.5 |
| 4,514,125 A | * | 4/1985 | Stol | 411/82.3 |
| 4,516,886 A | * | 5/1985 | Wright | 405/259.6 |
| 5,028,188 A | * | 7/1991 | Prince | 411/67 |
| 5,344,257 A | * | 9/1994 | Wright et al. | 405/259.4 |
| 5,599,140 A | * | 2/1997 | Wright | 405/259.6 |
| 5,634,752 A | * | 6/1997 | Haage et al. | 411/82 |
| 5,653,563 A | * | 8/1997 | Ernst et al. | 411/82 |
| RE35,629 E | * | 10/1997 | Murakami et al. | 369/288 |
| 5,730,565 A | * | 3/1998 | Hein et al. | 411/82 |
| 5,791,824 A | * | 8/1998 | Radtke | 405/259.5 |
| 5,885,041 A | * | 3/1999 | Giannuzzi et al. | 411/82 |
| 5,895,186 A | * | 4/1999 | Giannuzzi et al. | 411/82 |
| 2006/0013657 A1 | * | 1/2006 | Morris | 405/259.6 |

* cited by examiner

*Primary Examiner* — Gary Estremsky
(74) *Attorney, Agent, or Firm* — Abelman, Frayne & Schwab

(57) ABSTRACT

A fastening element (11) for anchoring in a borehole (7) with a hardenable compound (31) has a shaft (13) extending along a longitudinal axis (12), a mixing element (22), and a profiling element (26) with radially protruding profiling sections.

6 Claims, 2 Drawing Sheets

FASTENING ELEMENT

BACKGROUND OF THE INVENTION

1. Field of the Invention

The present invention relates to a fastening element for anchoring in a borehole with a hardenable compound and having a shaft extending along a longitudinal axis and a mixing element.

2. Description of the Prior Art

For chemical anchoring of a fastening element such as anchor rod, threaded rod, threaded sleeve, screw anchor, or reinforcement bar in a substrate such as a constructional component or a workpiece, a borehole is produced, cleaned, and filled with a hardenable compound which advantageously includes multiple components, e.g., a two-component mortar compound. The fastening element is then set in the filled borehole. After the compound hardens, the fastening element has high load values. Unlike mechanically anchored fastening elements, fastening elements of the kind described above are anchored in the substrate without expansion forces so that there is the possibility of small edge distances and axial distances of the anchored fastening element in the substrate. Mounting parts are secured to the substrate, for example, by nuts, at the free end of the fastening element anchored in the substrate.

EP 0 150 555 A1 discloses a fastening element with a mixing knife that forms a mixing element. The fastening element is introduced into a borehole outfitted with a cartridge. When the fastening element is screwed in, e.g., with a rotary driving device, the cartridge is destroyed and the components of the hardenable, multi-component compound are mixed together.

As was stated, for example, in DE 34 42 383 A1, it was considered essential in technical circles up until now to clean the borehole prior to introducing the hardenable multi-component compound, which represents a substantial expenditure for producing the attachments, particularly for series applications.

SUMMARY OF THE INVENTION

It is the object of the present invention to provide a fastening element which can be anchored in a borehole with a hardenable compound and which can be set in a borehole that has not been cleaned beforehand while, nevertheless, achieving sufficiently high load values.

This and other objects of the present invention, which will become apparent hereinafter, are achieved by providing a fastening element with a profiling element with radially protruding profiling sections.

In this way, not only is a mixing area provided at the fastening element, but also a profiling area which, in addition, takes on a cleaning function for the borehole. When the fastening element is set, the hardenable compound which was introduced into the borehole beforehand is mixed up, and the borehole wall is profiled at the same time. In doing so, any drill dust, moisture and/or other separating agents, which are deposited on the borehole wall, are at least partially removed therefrom so that at least a partial cleaning of the borehole takes place. The transmission of force is ensured by a form-locking engagement of the hardened compound with the borehole wall, on one hand, and by the adhesion of the hardened compound to the substrate, on the other hand. Since the surface roughness of the borehole wall, which is produced by the profiling element, improves the formlocking engagement, on one hand, and as a result of the cleaning effect, the adhesion between the hardened compound and the borehole wall, on the other hand, the transmission of higher load values from the fastening element into the substrate is made possible, although a separate cleaning of the borehole has been dispensed with.

The drill dust or drillings produced during the drilling process are left in the borehole when the hardenable compound is introduced. The treatment of the borehole and at least the partial cleaning of the borehole wall with the profiling element take place during the setting of the fastening element, namely, at the same time as the mixing of the hardenable compound that advantageously includes more than one component. Since these working processes are carried out in one step, the cost of producing a chemical anchoring with a fastening element of this kind is reduced in comparison to previously known solutions.

The fastening element is advantageously screwed into the borehole mechanically by a rotary driving device such as, e.g., a drill hammer or screw-driving device. The fastening element is arranged, for example, directly in a tool holder of the rotary driving device. After reaching the required anchoring depth, the rotary driving device is detached from the fastening element. At the end of the temperature-dependent curing time for the hardenable compound, a mounting part can be fastened to the substrate at the free end of the fastening element projecting out of the substrate.

A plurality of components of a hardenable multi-component compound can be introduced in the borehole in unmixed state so that a mixing element at the pressing-out device in front of the borehole can be dispensed with. This substantially reduces the expenditure of force required for dispensing the components with a pressing-out device. The mixing element on the fastening element ensures a sufficiently thorough mixing of the components of the hardenable compound, while at the same time mixing a portion of the drill dust or drillings found in the borehole into the hardenable compound. Since the components react with one another only within a limited area, the available processing time during which the fastening element must be inserted into the borehole is substantially increased compared to a hardenable compound which is already mixed when inserted into the borehole. This is advantageous especially in series applications in which multiple fastening elements must be set. Further, only a limited hardening of the components takes place in the injection tube, if at all, which reduces mortar losses and the amount of waste. Further, an injection tube without a static mixer is considerably easier to produce than one with a static mixer so that the cost of carrying out a setting of a fastening element is substantially reduced. Further, isolating the processing time from the curing time of the hardenable multi-component compound makes it possible to use faster-curing compounds.

The maximum extension of the profiling element in the area of the radially protruding profiling sections preferably corresponds to 1.02-times to 1.2-times of the nominal diameter of the borehole. The excess dimensioning of the profiling element relative to the borehole ensures a sufficient profiling of the borehole wall when screwing or setting the fastening element in the borehole.

The mixing element and the profiling element are preferably provided on a separate element which has a connection portion for connection with the fastening element. If necessary, the separate element can be mounted on the fastening element. Depending on the shape of the borehole, particularly with respect to its nominal diameter, the corresponding element having the mixing element and the profiling element is provided on the fastening element.

The connection portion preferably comprises a threaded portion which can be screwed together with a mating threaded portion of the fastening element, which ensures a simple, reliable and nondetachable arrangement of the separate element at the fastening element. This construction of the separate element is advantageous particularly when a threaded rod is used as a fastening element. Alternatively, the connection portion and the mating connection portion are parts of a plug-in connection for connecting the fastening element and the separate element by a frictional and/or formlocking engagement. Further, the separate element can also be fastened to the fastening element with a separate fastener, e.g., a screw or rivet.

The mixing element preferably has radially protruding wing elements and, in an advantageous manner, extends in a planar manner radially relative to the longitudinal axis of the fastening element. In an advantageous manner, this mixing element ensures a sufficiently thorough mixing of the components of the hardenable compound and accompanying mixing of at least a portion of the drill dust or drillings located in the borehole into the hardenable compound.

The radially protruding profiling sections are preferably threaded portions which cut into the wall of the borehole when the fastening element is screwed into the borehole. The threaded sections are advantageously formed as a self-tapping thread which is known from the technical field of self-tapping concrete screws.

The radially protruding profiling sections are preferably arranged in a radially springing manner. The profiling sections can be deflected at least to a limited extent, for example, radially inwardly and/or, in a particularly advantageous manner, can be spring-loaded radially outwardly so that the profiling sections are in contact with the borehole wall and, accordingly, profile the wall during the entire time that the fastening element is being screwed in.

The profiling element preferably has a base portion from which spacer sections project, at least one of the radially protruding profiling sections being provided at their free ends. The base portion of the profiling element advantageously extends along a plane projecting radially from the longitudinal axis of the fastening element. This enables an advantageous profiling of the borehole wall because the profiling element extends at a distance from the mixing element. The mixing element is advantageously provided in front of the profiling element with reference to the setting direction. In another advantageous variant, the profiling element can also be arranged in front of the mixing element so that the borehole wall is already profiled before the actual mixing of the hardenable compound. Spacer portions which face one another form a receptacle for one end of the fastening element.

The radially protruding profiling sections are preferably offset axially relative to one another so that the profiling element has a pitch. This pitch determines the setting speed of the fastening element and, therefore, the mixing intensity during the mixing of the hardenable compound and the accompanying mixing in of at least a portion of the drill dust or drillings located in the borehole.

At least the radially protruding profiling sections preferably have a hardness of at least 700 HV so that they have a sufficient hardness for an advantageous profiling of the borehole wall also in mineral substrates such as concrete.

At least the profiling element is advantageously formed of sheet metal as a stamped-bent part, which ensures a simple production of the same. When the profiling element is a part of a separate element which also comprises, e.g., the mixing element, this separate element is also constructed in its entirety as a stamped-bent part, for example. The separate element can have one or more parts.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show.

In the drawings, the same parts are provided with the same identical reference numerals.

DETAILED DESCRIPTION OF THE PREFERRED EMBODIMENTS

Figure 1:
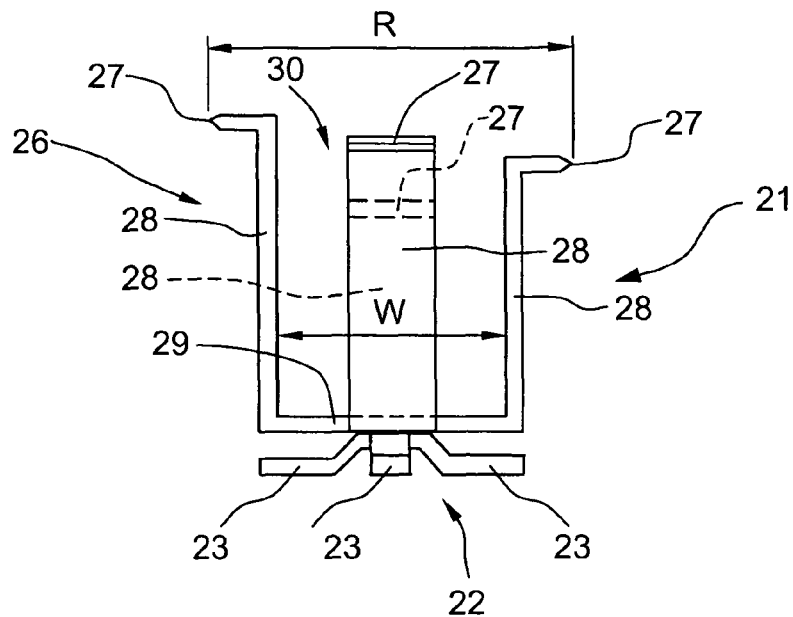
FIG. 1 a side view of a first embodiment of a fastening element according to the present invention with a mixing element and a profiling element.

An element 21 which is shown in FIG. 1, has a mixing element 22 and a profiling element 26. The mixing element 22 and the profiling element 26 are stamped-bent parts made of sheet metal which are connected to one another to form an element 21. The mixing element 22 extends in a plane and has a plurality of radially protruding wing elements 23.

The profiling element 26 that is provided in addition, has a base portion 29 extending along a plane which extends transverse to the longitudinal axis 12 of a fastening element 11 that can be connected with the element 21 and spacer portions 28 projecting from this base portion 29. The spacer portions 28 have radially protruding profiling sections 27 at their free ends. The maximum radial extension R of the profiling element 26 in the area of the radially protruding profiling sections 27 corresponds to 1.02-times to 1.2-times of the nominal diameter N of the borehole 6 in the substrate 6, e.g., a concrete surface. The radially protruding profiling sections 27 are mounted in a radially springing manner. Further, the radially protruding profiling sections 27 are offset axially relative to one another with reference to the base portion 29 so that they have a pitch which determines the setting speed of the fastening element 11 when it is screwed into the borehole 7 and, therefore, the mixing intensity. At least the radially protruding profiling sections 27 advantageously have a hardness of at least 700 HV.

The spacer portions 28 facing one another form a receptacle as a connection portion 30 of the element 21 so that when the element 21 is arranged at an end of the fastening element 11 the spacer portions 28 partially engage this end. The element 21 is fitted to the end of the fastening element 11, for example, or is arranged at the latter with a screwing motion. The clearance W between two spacer portions 28 is advantageously less than the outer diameter A of the fastening element 11 at least in some areas.

Figure 2:
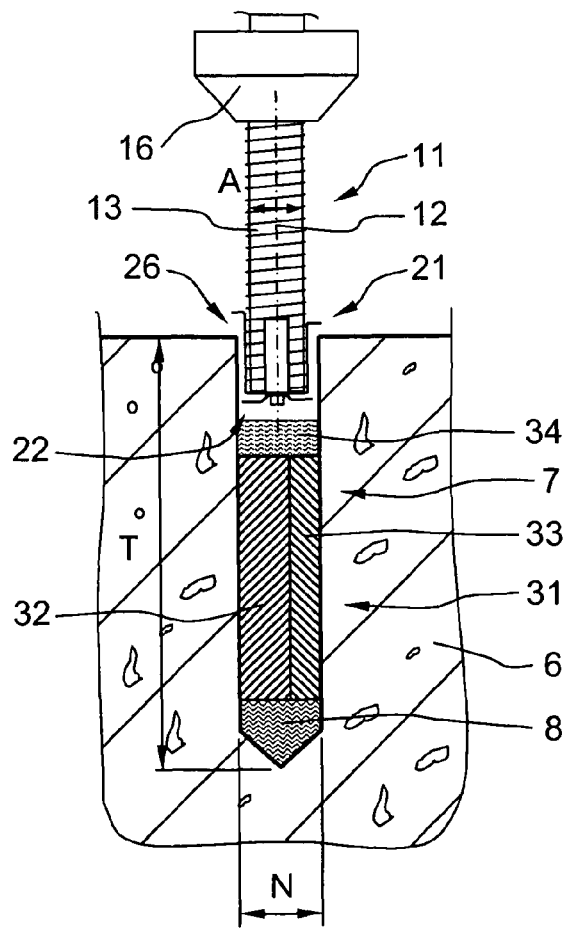
FIG. 2 a longitudinal cross-sectional view illustrating the setting process.

In the setting procedure for setting the fastening element 11, only one step of which is shown schematically in FIG. 2, a borehole 7 is first prepared, not shown, in the substrate 6 by a drill, e.g., a hammer drill. The borehole 7 is produced with a depth T which is 5% to 15% deeper than the required anchoring length of the fastening element 11. The drill dust or drillings 8 produced by the drilling process remain in the borehole 7.

Without cleaning the borehole 7 beforehand, the borehole 7 is subsequently filled with a hardenable multi-component compound 31 by a pressing-out device, not shown. The two components of the hardenable compound 31, resin 32 and hardener 33, are introduced into the borehole 7 without mixing. Optionally, a defined amount of filling material 34 can then be introduced into the borehole 7 in addition. When the hardenable compound 31 is introduced into the borehole 7, it is advantageous to make sure that the borehole is filled from its bottom up without bubbles. The amount of hardenable compound 31 to be introduced depends upon the volume remaining between the borehole 7 and the fastening element 11. For example, the borehole 7 can be filled halfway or two thirds full with the hardenable compound 31.

After arranging the element 21 at one end of a fastening element 11, which has a shaft 13 extending along a longitudinal axis 12, the fastening element 11 with the element 21 in front is inserted into the borehole 7 and mechanically screwed into the filled borehole 7 by a drill hammer as a rotary driving device until the required anchoring length of the fastening element 11 is reached. Only the tool holder 16 of the rotary driving device is shown in FIG. 1. In doing so, the resin 32, hardener 33 and a portion of the drill dust or drillings 8 located in the borehole are mixed together. At the same time, the wall of the borehole 7 is profiled by the radially protruding profiling sections 27 of the element 27 to generate undercuts.

A threaded rod provided with a right-hand thread is advantageously used as fastening element 11 and is screwed into the borehole 7 by counterclockwise or clockwise rotation. The hardenable compound 31 is conveyed into the borehole 7 by the right-hand thread as the fastening element 11 is screwed in with a counterclockwise rotation, and a certain compression of the hardenable compound 31 and drill dust or drillings 8 located at the base of the borehole is accordingly achieved in the borehole 7.

After reaching the required anchoring length of the fastening element 11, the rotary driving device is disengaged from the fastening element 11. When the hardenable compound 31 has hardened, a mounting part, not shown, can be fastened to the substrate 6 at the free end of the fastening element 11.

Figure 3:
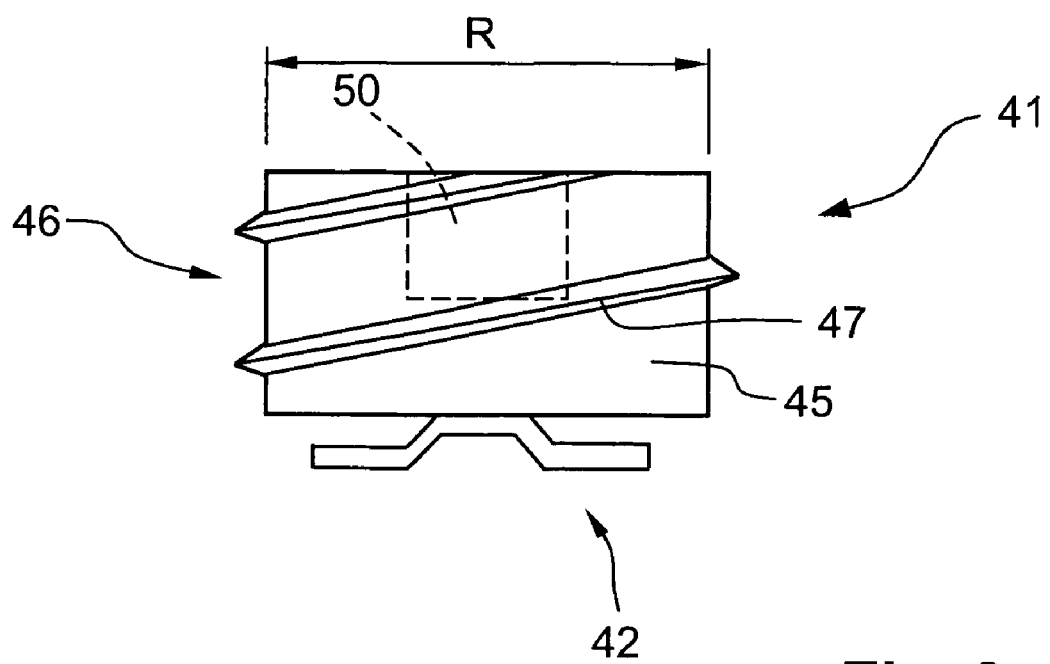
FIG. 3 a side view of a second embodiment of a fastening element according to the present invention with a mixing element and a profiling element.

The element 41 shown in FIG. 3 comprises a base body 45, a mixing element 42 being provided at one of its ends, and a pocket hole with an internal thread as a connection portion 50 being provided at the opposite end. In order to arrange the element 41 on the fastening element 11, the element 41 is screwed onto the corresponding end of the fastening element 11, e.g., a threaded rod, by its connection portion 50.

A self-tapping thread which forms the radially protruding profiling sections 47 extends circumferentially. The entire element 41 and/or the radially protruding profiling sections 47 are advantageously tempered or made of a material having a sufficient hardness for profiling the wall of the borehole 7. The hardness at least of the radially protruding profiling sections 47 is advantageously at least 700 HV.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A fastening element for being anchored in a borehole (7) with a hardenable compound (31), comprising a shaft (13) extending along a longitudinal axis (12); a mixing element (22); and a profiling element (26) having a base portion (29), spacer portions (28) projecting from the base portion (29) substantially parallel to the longitudinal axis (12) and provided at free ends thereof with radially protruding profiling sections (27) which are radially deflectable in a direction substantially perpendicular to the longitudinal axis (12), wherein the mixing element (22) is fixedly attached to the base portion (29) at a side of the base portion (29) remote from the spacer portions (28), forming with the profiling element (26) a separate element (21) having a connection portion (30) for mounting the separate element (21) on the shaft (13), the connection portion (30) being formed by the spacer portions (28) forming a receptacle for receiving a shaft end portion.

2. A fastening element according to claim 1, wherein the profiling element (26; 46) has, in an area of the radially protruding profiling sections (27; 47), a maximum radial extension (R) adapted to be 1.02-times to 1.2-times of the nominal diameter (N) of the borehole (7).

3. A fastening element according to claim 1, wherein the connection portion (50) has a threaded portion which can be screwed together with a mating threaded portion of the fastening element (11).

4. A fastening element according to claim 1, wherein the mixing element (22; 42) has radially protruding wing elements (23).

5. A fastening element according to claim 1, wherein at least the radially protruding profiling sections (27; 47) have a hardness of at least 700 HV.

6. A fastening element according to claim 1, wherein the radially protruding profiling sections (27) of the spacer portions (28) are axially offset relative to each other.

* * * * *